(12) United States Patent
Gisinger et al.

(10) Patent No.: US 6,302,424 B1
(45) Date of Patent: Oct. 16, 2001

(54) FORCE-SENSING FIFTH WHEEL

(75) Inventors: Jack L. Gisinger; Gerald W. Hungerink, both of Holland, MI (US); Peter J. Milner, Hinckley (GB)

(73) Assignee: Holland Hitch Company, Holland, MI (US)

( * ) Notice: Subject to any disclaimer, the term of this patent is extended or adjusted under 35 U.S.C. 154(b) by 0 days.

(21) Appl. No.: 09/457,900

(22) Filed: Dec. 9, 1999

(51) Int. Cl.⁷ .................................................. B62D 53/06
(52) U.S. Cl. .......................... 280/433; 73/862.57; 73/767
(58) Field of Search .................... 73/862.57, 767, 73/781, 862.03, 862.041; 280/432, 433, 422, 439; 177/136

(56) References Cited

U.S. PATENT DOCUMENTS

| | | |
|---|---|---|
| Re. 35,301 | 7/1996 | Reichow . |
| 1,994,388 * | 3/1935 | Erichsen .................................... 265/1 |
| 3,410,135 * | 11/1968 | Reynaud .................................. 73/141 |
| 4,386,533 * | 6/1983 | Jackson et al. .................... 73/862.64 |
| 4,659,101 | 4/1987 | Buckley . |
| 4,864,874 * | 9/1989 | Hafner ................................ 73/862.38 |
| 5,060,965 * | 10/1991 | Haefner et al. ....................... 280/504 |
| 5,286,094 | 2/1994 | Milner . |
| 5,289,435 | 2/1994 | Milner et al. . |
| 5,435,194 | 7/1995 | Schedrat et al. . |
| 5,438,881 | 8/1995 | Schedrat et al. . |
| 5,493,920 | 2/1996 | Schedrat et al. . |
| 5,511,812 | 4/1996 | Milner . |
| 5,526,702 * | 6/1996 | Schedrat et al. ................... 73/862.57 |

* cited by examiner

*Primary Examiner*—Daniel G. DePumpo
(74) *Attorney, Agent, or Firm*—Price, Heneveld, Cooper, DeWitt & Litton

(57) ABSTRACT

A sensing system employs multiple sensors utilizing mounting structure integrated into a fifth wheel hitch and which is protected from the environment, is capable of accurately measuring forces along longitudinal and vertical axes for providing information as to roll, pitch, yaw, and drawbar load and which utilizes sensors which provide output signals for display and control. In one embodiment, a fifth wheel includes mounting boxes formed on an undersurface thereof on opposite sides of the kingpin receiving slot and a force-sensing unit mounted within each of said mounting boxes. Each force-sensing unit includes a vertical sensor positioned fore and aft of the vertical hitch axis and forward and aft horizontal force sensors. In a preferred embodiment of the invention, each of the sensors are mounted to the sensing unit utilizing elastomeric springs coupling the fifth wheel plate to the force-sensing unit and a plunger for coupling forces from said elastomeric spring to a force sensor itself.

29 Claims, 7 Drawing Sheets

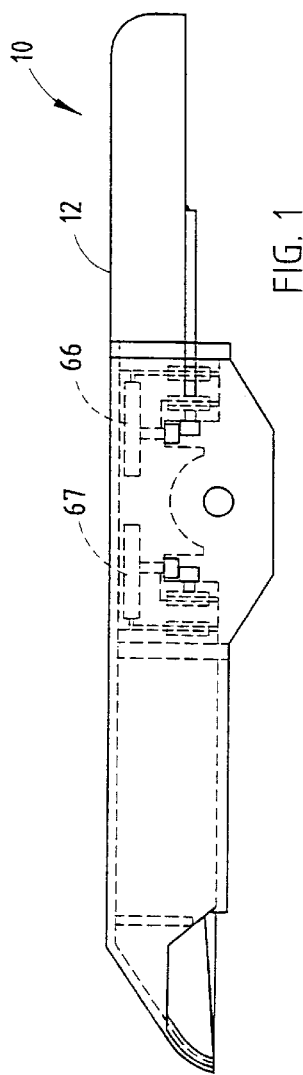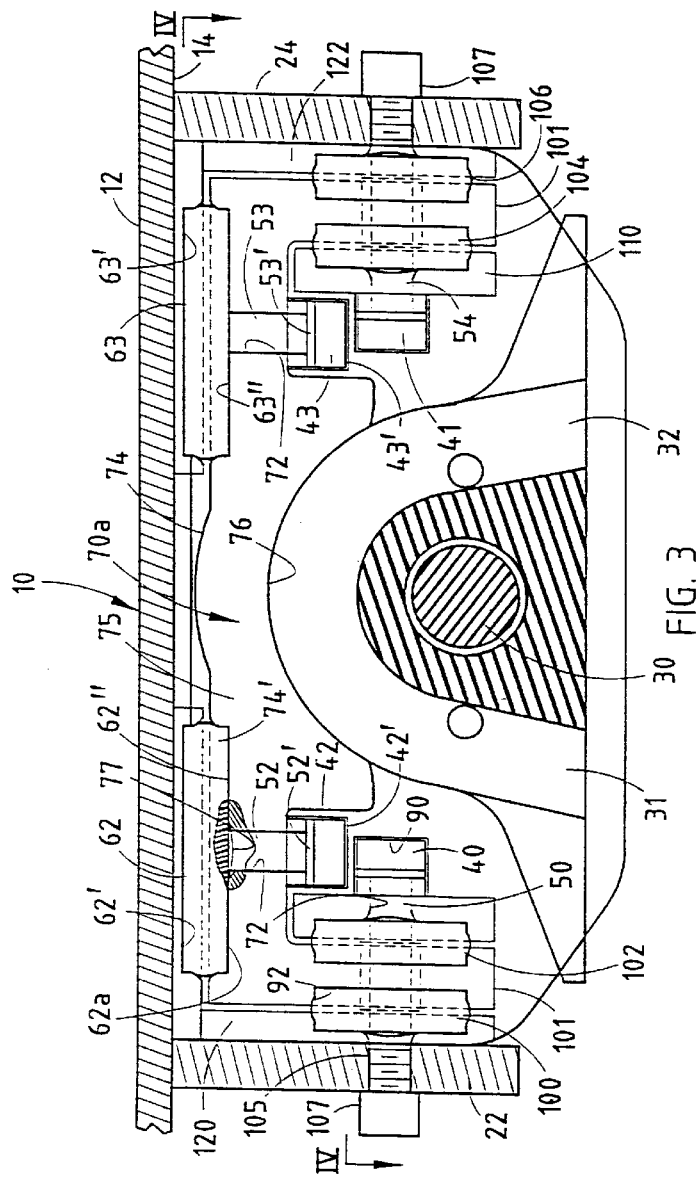

FORCE-SENSING FIFTH WHEEL

BACKGROUND OF THE INVENTION

The present invention relates to a fifth wheel hitch for receiving a kingpin of a trailer and one which has the ability to sense forces between the trailer bolster plate, kingpin and the fifth wheel and a circuit to process such sensed information.

The identification of forces between a truck trailer and a truck hitch is useful for a variety of reasons. Such information can be employed, for example, in an automatic braking system whereby signals from a sensing system can be employed to prevent excessive braking on one or more wheels or otherwise control braking for safe acceleration. In addition, such systems are helpful in alerting the vehicle operator to excessive trailer movement, such as pitching, yaw and/or potentially dangerous roll conditions.

As can be appreciated, the interconnection between a trailer kingpin and a fifth wheel assembly provides a relatively harsh environment for detection of the large forces involved and efforts to provide accurate sensing information with signals from a sensor which are linearly related to the detected forces has been difficult. U.S. Pat. Nos. 5,286,094 and 5,289,435 represent one sensor construction and a mounting employed for measuring push and pull forces on a hitch connection. It would be desirable, however, to provide additional information such as pitch, yaw and roll information for use by the driver in safely operating the vehicle.

The sensing of multiple axis force information between the coupling of a trailer to a tractor is difficult not only due to the harsh environment to which the equipment is exposed but also the relatively large and rapidly varying forces encountered and finally the difficulty in providing a linear output signal from sensors which may be employed.

SUMMARY OF THE INVENTION

The system of the present invention provides a sensing system which employs multiple sensors utilizing mounting structure which can be integrated into a fifth wheel hitch and which is protected from the environment and capable of accurately measuring forces along longitudinal and vertical axes for providing information as to roll, pitch, and yaw. The system utilizes sensors which provide a relatively linear electrical output signal which can be used for displaying such forces, for generating alarms, or for controlling the vehicle operation.

Systems embodying the present invention comprise a fifth wheel having mounting boxes formed on an undersurface thereof on opposite sides of the kingpin receiving slot and a force-sensing unit mounted within each of said mounting boxes. Each force-sensing unit includes a forward and aft sensor positioned fore and aft, respectively, of the vertical hitch axis and forward and aft longitudinal force-sensing sensors. With a force-sensing unit on the left and the right side of the fifth wheel assembly, eight such sensors provide signal information which can be used to determine roll, pitch and yaw movements derived from the detected vertical and longitudinal forces on the hitch.

In a preferred embodiment of the invention, each of the sensors are mounted to the sensing unit utilizing elastomeric springs coupling the fifth wheel plate to the force-sensing unit and a plunger for coupling forces from said elastomeric spring to a force sensor itself. The longitudinal sensors in the preferred embodiment also include a pair of elastomeric springs for preloading the sensor such that it is capable of sensing forces in both directions. Also in a preferred embodiment of the invention, the plungers are mounted within a cylindrical aperture having a curved opening allowing the elastomeric spring to deform linearly into contact with the plunger as force is applied thereto.

With such a system, a force-sensing fifth wheel assembly is provided which measures forces in vertical and horizontal axes between the kingpin coupling to the fifth wheel and provides accurate signal information to an electrical circuit which can display pitch, roll and yaw and vertical load information to the vehicle for use in controlling the safe operation of the vehicle.

These and other features, objects and advantages of the present invention will become apparent upon reading the following description thereof together with reference to the accompanying drawings.

BRIEF DESCRIPTION OF THE DRAWINGS

FIG. 1 is a right-side elevational view of a fifth wheel assembly embodying the present invention;

FIG. 3 is an enlarged, fragmentary cross-sectional view of the left-side force-sensing nit taken along section lines III—III of FIG. 2;

DETAILED DESCRIPTION OF THE PREFERRED EMBODIMENT

Figure 2:
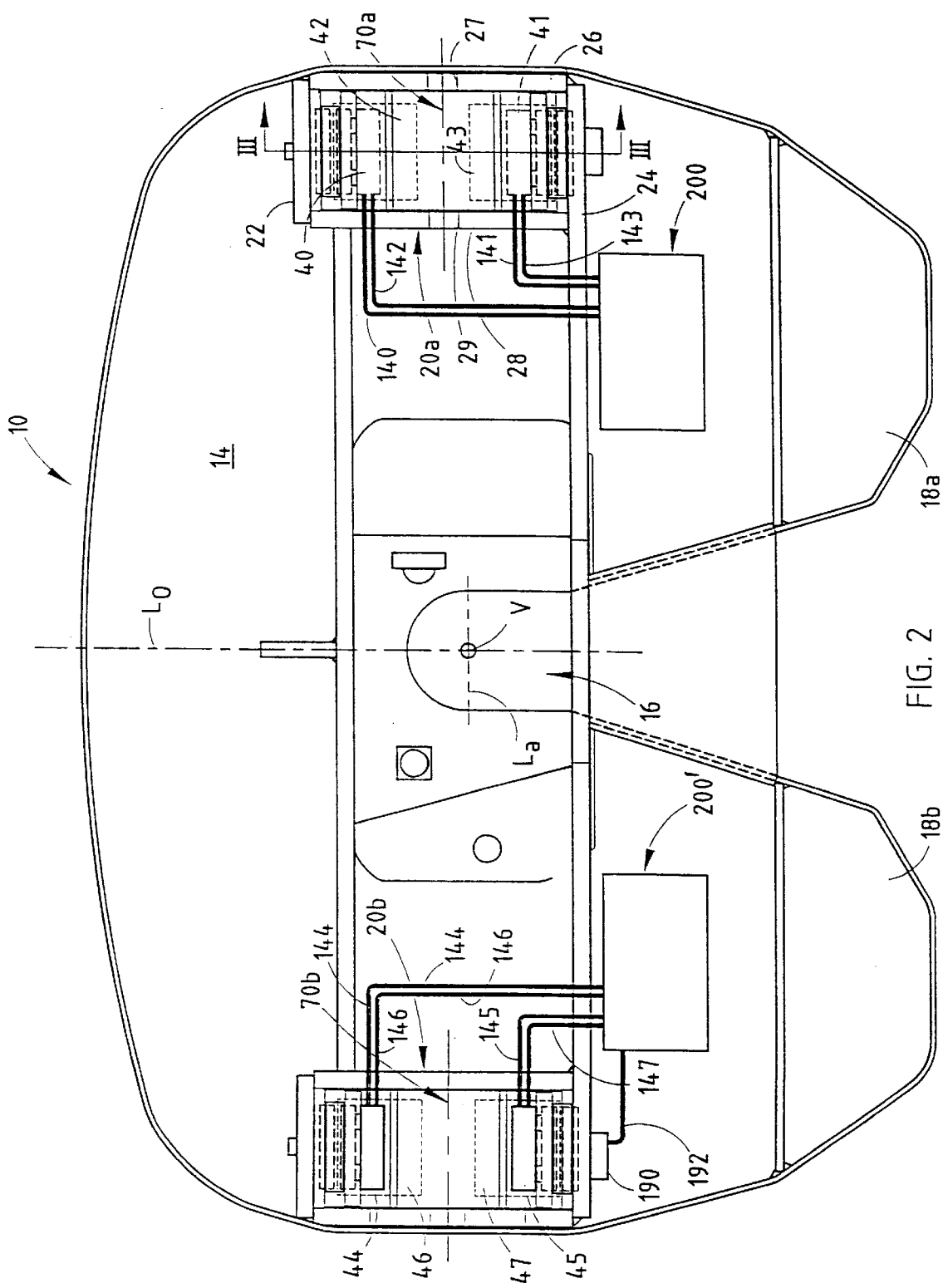
FIG. 2 is an enlarged bottom plan view of the fifth wheel shown in FIG. 1.

Referring initially to FIGS. 1–3, there is shown a fifth wheel 10 embodying the present invention which includes a top surface 12 (FIGS. 1 and 3), a bottom surface 14 (FIGS. 2 and 4), and a kingpin receiving slot 16 (FIG. 2) defined by bifurcated projections 18*a* and 18*b* for the left and right sides of the fifth wheel, respectively. Extending downwardly from the undersurface 14 of the fifth wheel 10 is a left-side mounting box 20*a* and a right-side mounting box 20*b*, each box being substantially the same and symmetrical. Each of the mounting boxes receive a force-sensing unit 70*a* or 70*b* described in greater detail below. Each box 20*a* and 20*b* are substantially identical and mirror images of one another, as are the force-sensing units 70*a* and 70*b*. Accordingly, following is a detailed description of the force-sensing unit 70*a* and its mounting relationship with respect to the fifth wheel 10, it being understood that force-sensing unit 70*b* is structurally substantially the same. The eight sensors are, however, separately identified, as are the signals provided by the fifth wheel sensing unit of the present invention.

The fifth wheel box 20a (FIGS. 2–4) includes a forward wall 22, a rear wall 24 which may extend the width of the fifth wheel 10, an outside wall 26 and an inside wall 28. Outside wall 26 includes an aperture 27 aligned with an aperture 29 in wall 28 for receiving a mounting pin 30 (FIG. 3) which couples the fifth wheel 10 to a tractor mounting bracket 32 secured to the tractor frame. The coupling of the fifth wheel 10 to mounting bracket 32 is conventional and employs an elastomeric interface 31 which, together with mounting pin 30, secures the fifth wheel to the tractor. It is understood, however, that the force-sensing units 70a and 70b interface between mounting brackets 32 and fifth wheel 10 such that all of the forces transmitted between the kingpin and the fifth wheel assembly 10 are transmitted through the force-sensing units 70a and 70b. Not shown in FIGS. 1 and 2 is the kingpin locking mechanism or other mechanical details of the fifth wheel assembly, which are described in greater detail in U.S. Pat. No. 4,659,101, the disclosure of which is incorporated herein by reference.

Before describing the force-sensing units 70a (and the substantially identical force-sensing unit 70b) in detail, the location of the eight sensors employed in the system of the present invention with respect to the longitudinal axis "$L_o$" (FIG. 2 of the fifth wheel 10) and lateral axis "$L_a$" which intersect at the vertical axis V are described in connection with FIGS. 1 and 2. The left-side of the fifth wheel assembly includes a forward, horizontal or longitudinal sensor 40 an aft longitudinal sensor 41 as best seen in FIGS. 2 and 3. The left sensing unit 70a also includes a forward vertical sensor 42 and an aft vertical sensor 43. Similarly, the right force-sensing unit 70b includes a forward longitudinal sensor 44, an aft longitudinal sensor 45, a forward right-side vertical sensor 46, and an aft right-side vertical sensor 47. The placement of the sensors and their mounting to the boxes 20a and 20b of the fifth wheel 10 is shown in FIGS. 1–4. Each of the sensors 40–47 comprises capacitive sensors which include a pair of conductive plates spaced from one another and mounted within a compressible bellows-type assembly which include an air and a dielectric material between the conductive plates. The capacitive sensors can be generally of the type disclosed in U.S. Pat. Nos. 5,286,094 and 5,289,435, the disclosures of which are incorporated herein by reference. Other sensors which can withstand the load levels encountered in this environment can also be used. The forces transmitted to the sensor, as described in greater detail below, causes the movement of the plates toward and away from one another a distance of approximately 2 mm, which results in a capacitance change which is employed to provide electrical signals for use with the electrical control circuit shown in FIG. 9 and described below.

Figure 5:
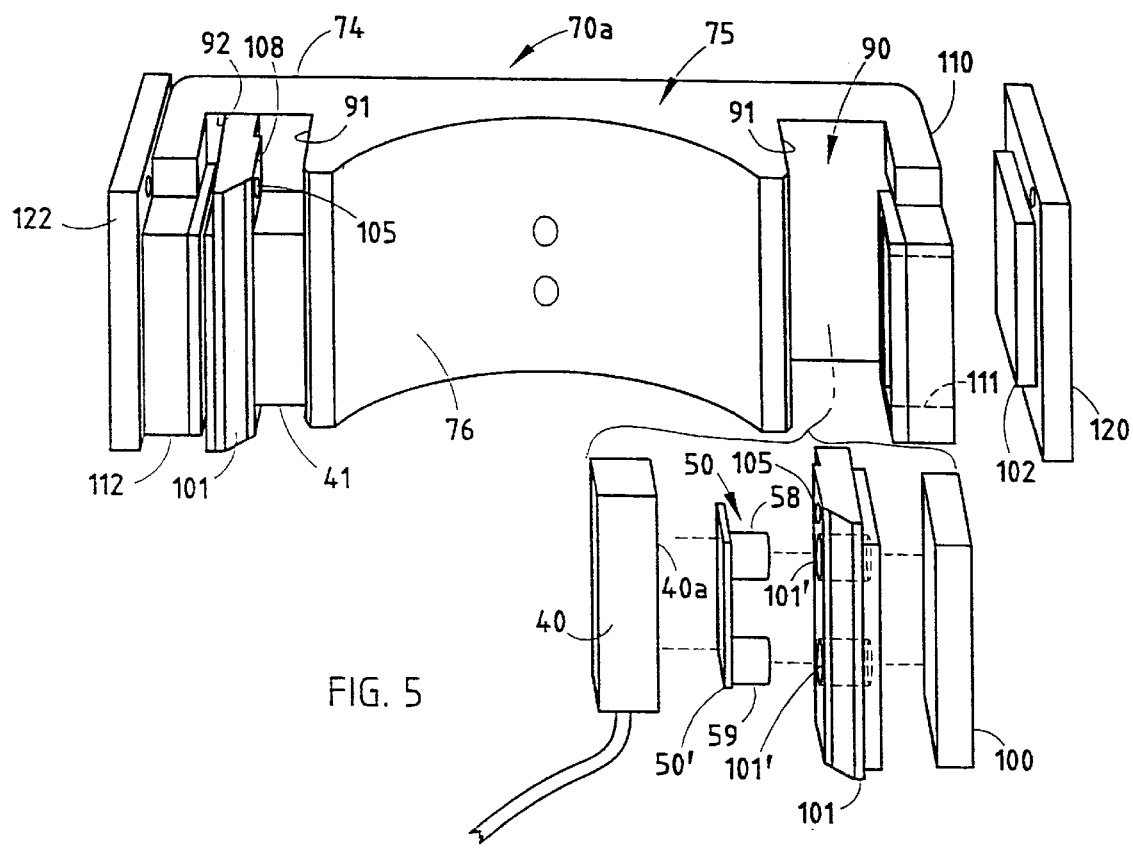
FIG. 5 is an enlarged, partly exploded, perspective view of one of the force-sensing units.
Figure 6:
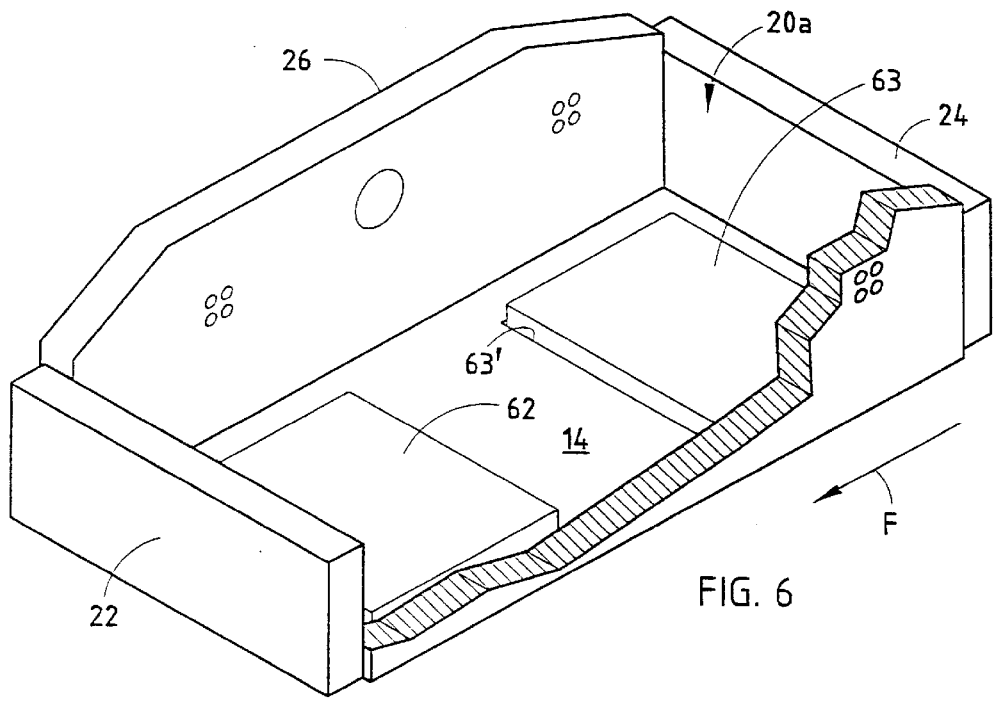
FIG. 6 is a fragmentary perspective view, partly broken away, of the left bottom side of the fifth wheel shown in FIGS. 1–4, with the force sensor removed therefrom.
Figure 7:
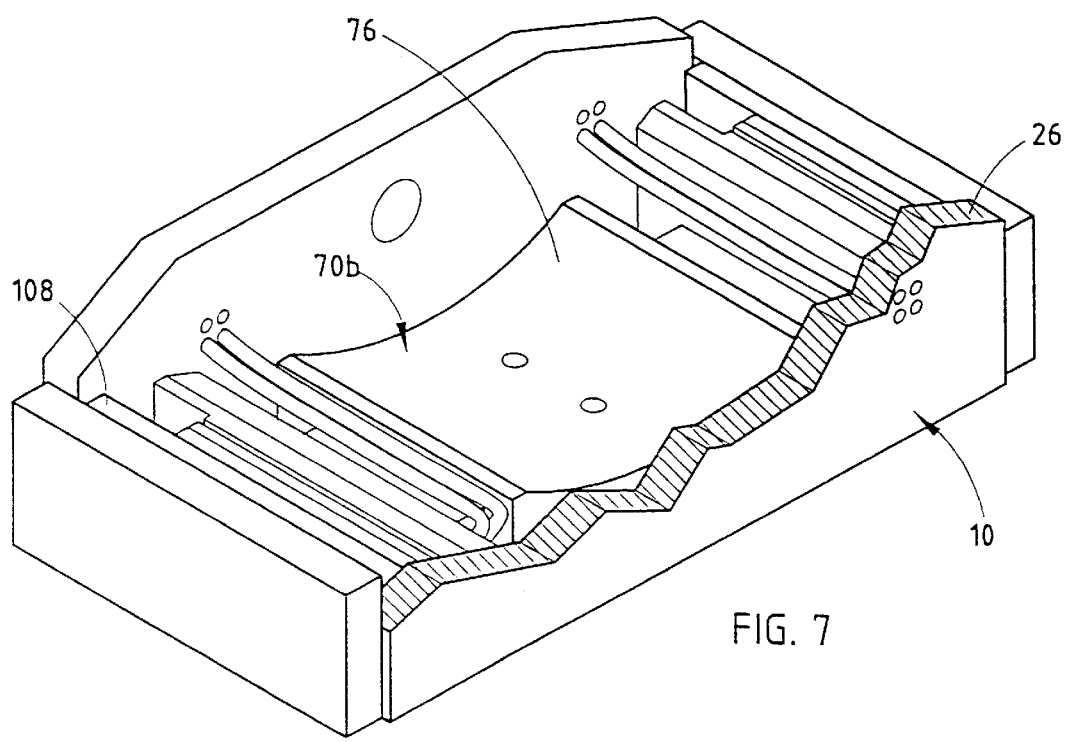
FIG. 7 is a fragmentary perspective view of the structure shown in FIG. 6, with the force-sensing unit installed therein.

As best seen in FIGS. 3 and 5, each of the force-sensing units 70a and 70b include a body 75 having semicylindrical downwardly formed surface 76 which mates with the similarly shaped mounting bracket 32, as seen in FIG. 3. The top surface 74 of body 75 is positioned in spaced relationship to the lower surface 14 of fifth wheel 10 with four elastomeric springs which are pads 62, 63, 66, and 67 positioned in pockets 62' and 63' formed in the lower surface 14 of fifth wheel plate as best seen in FIGS. 3 and 6 for the left side illustrated. Similarly, the right side includes pockets for receiving the resilient polymeric pad springs for the right side force-sensing unit. Thus, the elastomeric springs fore and aft of the lateral axis $L_a$ of the fifth wheel on each side of the longitudinal axis $L_o$ provide the interface between the fifth wheel plate and the force-sensing units 70a and 70b.

In a preferred embodiment of the invention, the vertical elastomeric springs, as well as the longitudinal elastomeric springs described below are made of natural rubber, having a 60IRHD, although polyurethane or other elastomeric materials having minimal hysteresis can be employed as well. In the preferred embodiment, the vertical pads 62, 63, 66 and 67 were approximately 90 mm by 70 mm and had a thickness or depth, as viewed in FIG. 3, of approximately 15 mm. The top surface 74 of the force-sensing unit bodies 75 likewise includes pockets 62" and 63" (FIG. 3) for receiving the resilient elastomeric pads 62 and 63 leaving a gap between the lower surface 14 of the fifth wheel and the top surface 74 of a force-sensing unit sufficient to allow the elastomeric springs to deform under the compressive vertical forces provided by the kingpin coupled to the fifth wheel.

The vertical pads 62, 63 engage spaced pairs of cylindrical plungers 52, 53 slidably extending in cylindrical apertures 72 of the body 75 which apertures extend downwardly from the floor of spring-receiving pockets 62" and 63" defining an interface having a shallow concave recess 77, as best seen in FIG. 3, such that the lower surface 62a, for example, of spring 62 can deform into the aperture 72 and engage the end of plunger 52 moving in a distance linearly related to the vertical force applied to the fifth wheel. The concave recess 77 and each of the interfaces between the vertical springs and the associated plungers 52 assure such forces are linearly transformed into plunger motion and the flat plates 52' joining each of the plungers, such as surface plate 52' illustrated for plungers 52, transferred to the associate sensor 42. Sensors 42 and 43 (and 46 and 47) are mounted in associated pockets 42' and 43' formed in body 75 such that the vertical forces on plate 12 are transmitted through pads 62, 63, 66, 67 and their associated plunger assemblies to the sensors 42, 43, 46 and 47. Electrical conductors 142, 143, 146 and 147 (FIGS. 2 and 9) electrically couple the sensors to the signal processing circuits 200, 200' on the protected under surface 14 of fifth wheel 10. Each of the four vertical sensors are of substantially identical construction as are the mating cylindrical apertures 72, recesses 77 and plungers associated therewith.

With reference now to FIG. 5, the horizontal or longitudinally extending sensors 40–43 are mounted within recesses 90 formed in the body 75 of each of the force-sensing units 70a and 70b. The sensors 40 are captively held to plate 101 by opposed facing slots 40b (FIGS. 8 and 8A) by a mounting clip 103' (FIG. 8A). Clip 103' has edges 105' which are spaced above the facing surface of plate 101 and is welded to plate 101. Clip 103' includes a stop tab 109 for positioning sensor 40 with respect to plate 101 and pressure plate 50' with the outer facing of an associated plunger 50 acted upon by a pair of elastomeric springs, such as pads 100 and 102, 104 and 106 associated with sensors 40 and 41, respectively. Clip 103' is not seen in FIG. 8 and plunger 50 is not shown in FIG. 8A. A pair of stacked serially coupled elastomeric springs are used in connection with each of the longitudinal or horizontal force sensors 40–43 to allow preloading of the sensors such that both acceleration and deceleration forces are detected by each of the four horizontal sensors (two on each side of the longitudinal axis $L_o$ of the fifth wheel).

The elastomeric springs, such as pads 100 and 102, are mounted on opposite sides of a downwardly extending intermediate plate 101 with apertures 101' (FIG. 8) for receiving plungers 58 and 59 of plunger 50. Each of the plates 101 includes a rectangular seat 103 (FIG. 8) for receiving an elastomeric spring or pad, such as pad 100 illustrated in FIGS. 5 and 8. The outer walls 110 and 112 of recesses 90 have rectangular apertures 111 therethrough to allow elastomeric pads, such as pad 102 mounted on end plate 120, to engage pad 100 for preloading its associated sensor 40 as described below.

Figure 4:
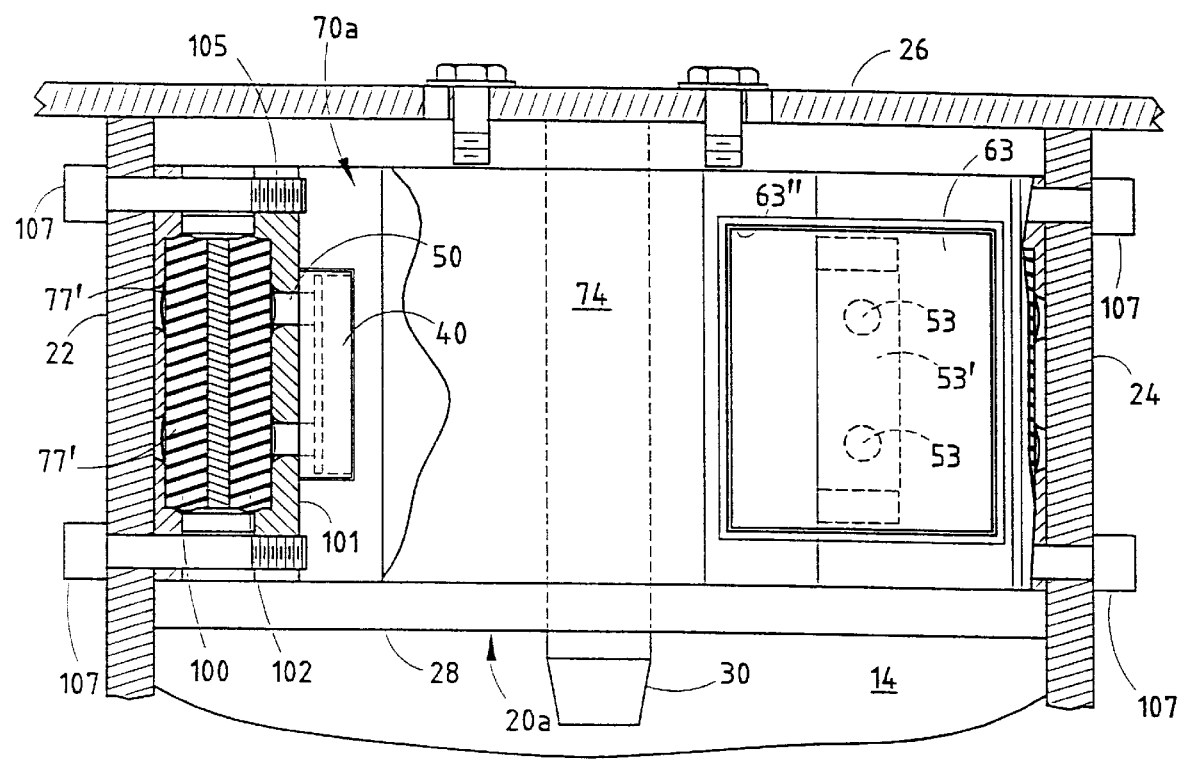
FIG. 4 is an enlarged, fragmentary bottom plan view, partly broken away and in cross section, of the sensing unit shown in FIG. 3.

End plates 22 and 24 extend over the outer plates 120 and 122 (FIG. 3) and include apertures for receiving a pair of spaced, threaded fasteners 107 at the forward and aft sides of each of the four sensing units for preloading the sensors 40–43 for each of the four sensing units. Fasteners 107 are threadably received by threaded apertures 105 in plates 101, as best seen in FIG. 4. Thus, the tightening of fasteners 107 compress the elastomeric springs or pads 100 and 102, 104 and 106, and the corresponding springs on the opposite side of the force-sensing unit) for each of the four sensing units to deflect plungers 50 into engagement with corresponding sensors 40–43 for preloading the sensors. The elastomeric springs 100, 102, 104, and 106 also communicate with apertures 72 having a bell-shaped concave entrance 77' (FIGS. 3 and 4) similar in shape to that of the vertical sensors discussed above such that the extrusion of the elastomeric springs into the apertures 72 translate the forces applied to the hitch from the trailer in a linear motion which is transferred to the horizontal sensors to provide a linear output signal in response thereto.

In a preferred embodiment of the invention, each of the concave radii surrounding the corresponding cylindrical apertures 72 for each of the vertical and horizontal sensor plungers had a radius of about 2 mm such that the diameter of the concave entry recesses 77 and 77' was approximately 4 mm larger than the diameter of apertures 72 for receiving the plungers 52 associated with each of the plunger assemblies 50. Each of the longitudinal springs 100, 102, 104, and 106, in a preferred embodiment, had a dimension of approximately 73 mm by 36 mm and a thickness (left to right in FIG. 3) of approximately 13 mm and were made of the same material as that of the vertical springs discussed above.

Figure 8:
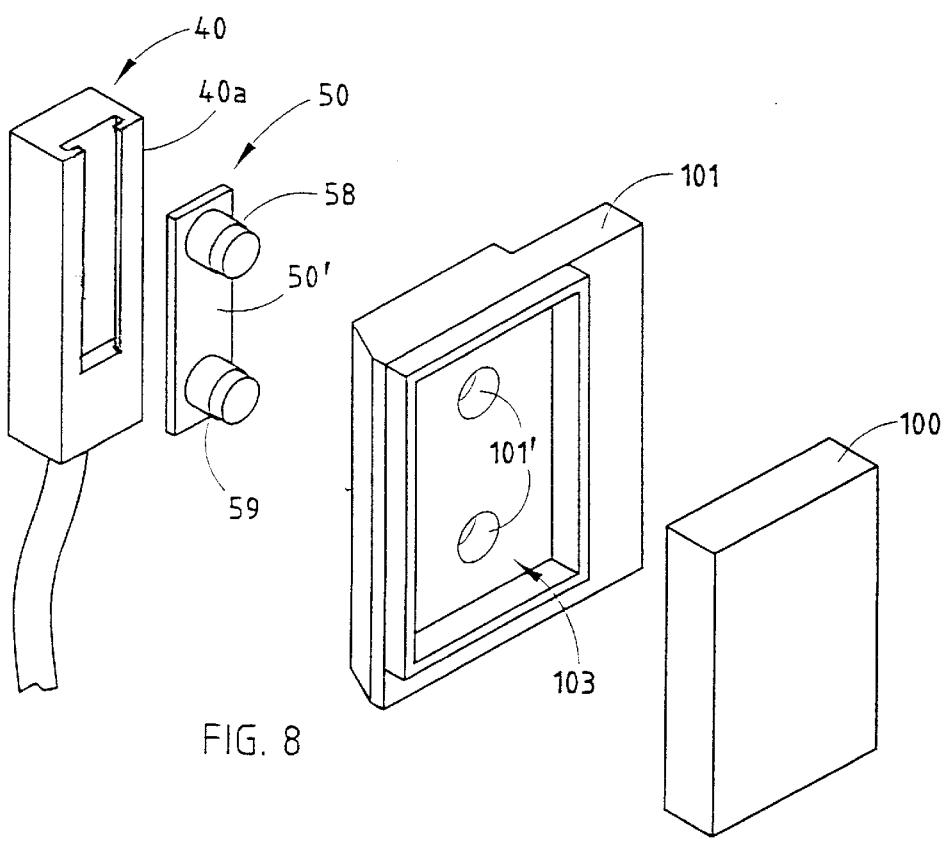
FIG. 8 is an enlarged perspective, exploded view of one of the horizontal or longitudinal sensors for mounting to one of the force-sensing units.
Figure 8A:
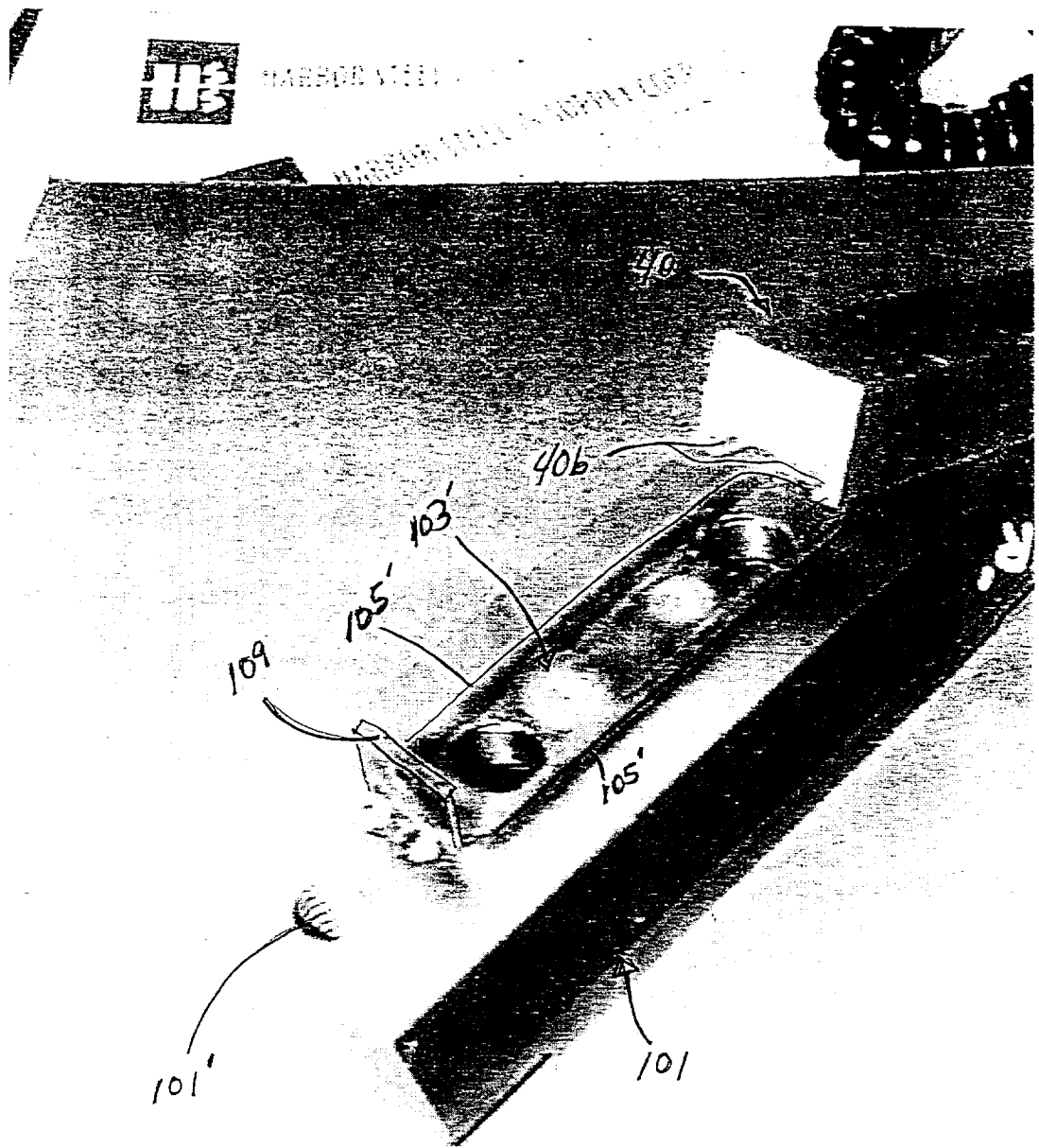
FIG. 8A is an enlarged exploded view of a longitudinal sensor, showing its mounting relationship.

The assembly of each of the force-sensing units is illustrated in FIGS. 5 and 8, with the sensor and plungers being positioned with respect to the elastomeric springs subsequently inserted into the force-sensing unit bodies 75 as illustrated in FIG. 5, which, in turn, is mounted within the rectangular housing 20a, as shown in FIG. 6, into which the vertical springs 62 and 63 have previously been mounted. With the force-sensing unit partially assembled, fasteners 107 are extended through apertures 105 in plates 101 of the assembly to preload the longitudinal sensors 40–43 with the elastomeric springs 100, 102, 104, and 106 deforming into the bell-shaped recesses 77' communicating with aperture 62 to move plungers 50 into engagement with the sensors 40–43 for preloading the sensors such that acceleration and deceleration forces can be sensed by each of the four longitudinal sensors.

Each of the sensors 40–47 are coupled by conductors 140 through 147 (FIGS. 2 and 9) comprising coaxial conductors which couple each of the sensors to interface electrical circuits 200 and 200' for processing the signals for each of the force-sensing units. A temperature sensor 190 may also be coupled to the fifth wheel at a convenient location, such as on wall 24, as shown in FIG. 2, and coupled to at least electrical circuit 200 via conductor 191.

Figure 9:
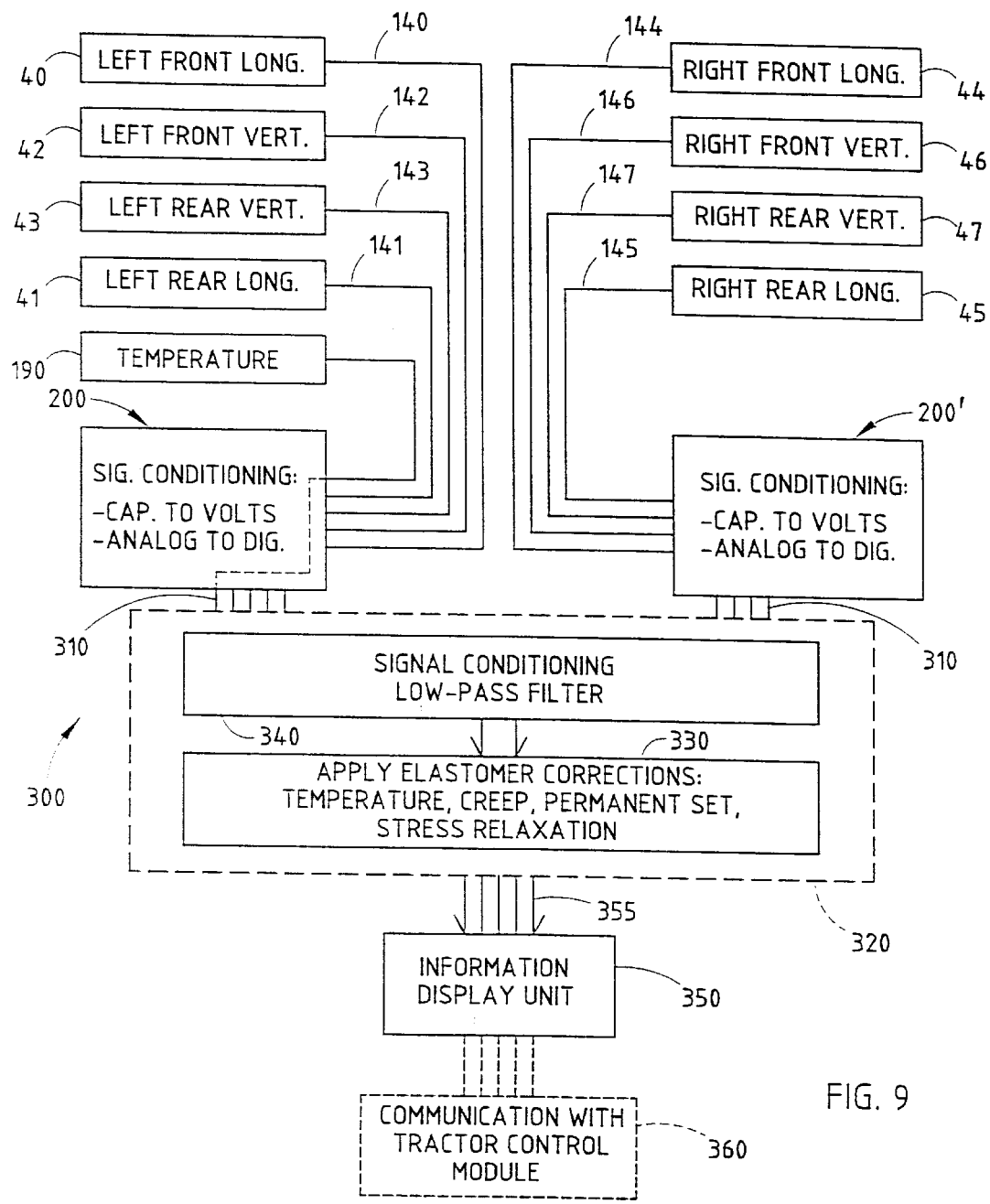
FIG. 9 is an electrical circuit diagram in block form of a circuit employed to utilize the information provided by the force-sensing system of the present invention.

Having described the mechanical construction of the sensors, the sensor actuating plungers, and the elastomeric springs together with their relationship to each of the eight sensing units and the relationship of the eight sensing units to the fifth wheel under frame, a description of the electrical circuit 300 shown in FIG. 9 and the signals from the sensors is now briefly described in connection with FIG. 9.

The capacitive sensors 40–47 are coupled to circuits 200 and 200' which are of a conventional design such as a voltage controlled oscillator which responds to change in capacitance to change the frequency thereof, which frequency can be converted to a digital signal representative of the frequency and, therefore, the capacitance which is related to the force applied to the sensors from the kingpin applying pressure on the fifth wheel. Forces on the vertical sensors range from approximately 0 up to 160,000 newtons with 80,000 newtons on the left and right side. The longitudinal forces applied to the longitudinal sensors varies from – 80,000 newtons to +80,000 newtons. Circuits 200 and 200' are coupled by suitable electrical conductor 310 mounted to the under surface of the fifth wheel and coupled to the electrical circuit 320 mounted to the vehicle itself.

Circuit 320 includes a microprocessor 330 which is coupled to conductors 310 through suitable interface circuit 340 and to an information display unit 350 via bus 355 in a conventional manner. Microprocessor 330 is programmed to apply any corrective information for the elastomeric material as a function of the temperature detected by temperature sensor 190 and responds to the signals from each of the eight sensors to provide left and right vertical load information which can be added and subtracted to provide roll moment information. Further, the eight signals are employed by detecting the front and rear vertical loads, which can be added and subtracted to provide pitch moment information. The four vertical sensors are added to provide total vertical load information while the longitudinal left and right signals can be added and subtracted to provide yaw information, all of which can be applied to the information display unit 350. These signals also can be applied to a tractor control module 360 which will include a microprocessor and which is provided typically by the tractor manufacturer for limiting braking activity for safe deceleration of the vehicle and trailer or warning signals to the driver indicating excessive pitch, yaw or tendency to roll, such that the driver can respond to audible or visual alarm signals to control the tractor trailer safely.

Thus, with the system of the present invention, signals are provided for use by the vehicle operator which accurately measures the coupling forces extending between the trailer and tractor in vertical and horizontal directions to the left and right of and forward and aft of the vertical axis of the kingpin. The system provides electrical signals which are related in a known manner to the forces applied from the trailer to the tractor by the improved force-sensing units of the present invention.

It will become apparent to those skilled in the art that various modifications to the preferred embodiments of the invention as described herein can be made without departing from the spirit or scope of the invention as defined by the appended claims.

The invention claimed is:

1. A force-sensing fifth wheel assembly comprising:
   a fifth wheel having a left-side pocket and a right-side pocket in the lower side thereof for receiving a force-sensing unit in each pocket; and
   a force-sensing unit mounted in each pocket, each force-sensing unit including a first pair of vertical sensors positioned forward of the lateral axis of the fifth wheel and a second pair of vertical sensors positioned rearwardly of the lateral axis of the fifth wheel, a first pair of horizontal sensors positioned forward of the lateral axis of the fifth wheel and a second pair of horizontal sensors positioned rearwardly of the lateral axis of the fifth wheel such that said force-sensing units provide eight channels of force-sensing information for use in determining total vertical load, longitudinal load, roll, pitch and yaw information with respect to the coupling of a trailer to the tractor.

2. The assembly as defined in claim 1 wherein each force-sensing unit comprises a body having recesses for receiving each of said sensors.

3. The assembly as defined in claim 2 wherein said body includes cylindrical apertures for receiving plungers associated with each sensor.

4. The assembly as defined in claim 3 wherein said body further includes recesses for receiving elastomeric springs associated with each sensor.

5. The assembly as defined in claim 4 wherein said apertures are formed with a concave interface permitting the elastomeric material to linearly deform into said cylindrical apertures.

6. The assembly as defined in claim 5 wherein said horizontal sensors include a pair of serially coupled elastomeric springs and a fastener for compressibly preloading a plunger associated with each horizontal sensor.

7. The assembly as defined in claim 6 and further including an electrical circuit coupled to said sensors for providing signal information for display of total vertical load, roll moment, pitch moment, yaw moment, and longitudinal load.

8. The assembly as defined in claim 7 and further including a display coupled to said electrical circuit for displaying total vertical load, roll moment, pitch moment, yaw moment, and longitudinal load.

9. The assembly as defined in claim 4 wherein said vertical and horizontal elastomeric springs comprise pads made of one of a rubber and polymeric material.

10. The assembly as defined in claim 9 wherein said springs for said vertical sensors are about 70 mm wide by 90 mm long with a thickness of about 15 mm.

11. The assembly as defined in claim 10 wherein said springs for said horizontal sensors are about 36 mm wide by 73 mm long and have a thickness of about 13 mm.

12. The assembly as defined in claim 1 wherein said sensors are capacitive sensors.

13. A force-sensing unit for a fifth wheel assembly comprising:
a housing for coupling to a fifth wheel between a tractor mountable bracket and the fifth wheel;
a first pair of vertical sensors positioned in said housing to be forward of the lateral axis of the fifth wheel and a second pair of vertical sensors positioned in said housing to be rearward of the lateral axis of the fifth wheel; and
a first pair of horizontal sensors positioned in said housing to be forward of the lateral axis of the fifth wheel and a second pair of horizontal sensors positioned in said housing to be rearward of the lateral axis of the fifth wheel, such that said sensors provide eight channels of force-sensing information to the coupling of a trailer to the tractor.

14. The assembly as defined in claim 13 wherein said housing includes elastomeric springs associated with each sensor.

15. The assembly as defined in claim 14 wherein said housing includes cylindrical apertures for receiving plungers extending between each sensor and an elastomeric spring.

16. The assembly as defined in claim 15 wherein said apertures have a concave radius permitting the elastomeric material to deform into said cylindrical apertures.

17. The assembly as defined in claim 16 wherein said horizontal sensors include a pair of serially coupled elastomeric springs and fastener for compressibly preloading said sensors.

18. The assembly as defined in claim 17 wherein said vertical and horizontal elastomeric springs comprise pads made of one of a rubber and polymeric material.

19. The assembly as defined in claim 18 wherein said springs for said vertical sensors are about 70 mm wide by 90 mm long with a thickness of about 15 mm.

20. The assembly as defined in claim 19 wherein said springs for said horizontal sensors are about 36 mm wide by 73 mm long and have a thickness of about 13 mm.

21. The assembly as defined in claim 13 wherein a pair of force-sensing units are provided for mounting to opposite sides of a fifth wheel.

22. A force-sensing fifth wheel assembly comprising:
a fifth wheel; and
a pair of force-sensing units mounted on opposite sides of said fifth wheel, wherein each force-sensing unit included a first pair of vertical sensors positioned forward and a second pair of vertical sensors positioned rearwardly of the lateral axis of the fifth wheel and a first pair of horizontal sensors positioned forwardly of the lateral axis of the fifth wheel and a second pair of horizontal sensors positioned rearwardly of the lateral axis of the fifth wheel, such that said force-sensing units provide eight channels of force-sensing information.

23. The assembly as defined in claim 22 wherein said sensors are capacitive sensors.

24. The assembly as defined in claim 22 wherein said fifth wheel includes pockets formed on an under side thereof for receiving said force-sensing units.

25. The assembly as defined in claim 22 wherein each force-sensing unit comprises a body having recesses for receiving each of said sensors.

26. The assembly as defined in claim 25 wherein said body includes cylindrical apertures for receiving plungers associated with each sensor.

27. The assembly as defined in claim 26 wherein said body further includes elastomeric springs associated with each sensor.

28. The assembly as defined in claim 27 wherein said horizontal sensors include a pair of serially coupled elastomeric springs and a fastener for compressibly preloading said associated sensor.

29. The assembly as defined in claim 28 wherein said elastomeric sensors are pads and said apertures are formed have a concave interface with said pads permitting the elastomeric material to linearly deform linearly into said cylindrical apertures.

* * * * *